(12) United States Patent
Sawada et al.

(10) Patent No.: US 8,271,168 B2
(45) Date of Patent: Sep. 18, 2012

(54) SHIFT CONTROLLER OF VEHICLE AUTOMATIC TRANSMISSION

(75) Inventors: Hiroyuki Sawada, Okazaki (JP); Masato Kaigawa, Toyoto (JP); Kei Kitajima, Toyota (JP); Yoshio Hasegawa, Chiryu (JP); Fuminori Monji, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 472 days.

(21) Appl. No.: 12/467,399

(22) Filed: May 18, 2009

(65) Prior Publication Data

US 2009/0292430 A1    Nov. 26, 2009

(30) Foreign Application Priority Data

May 20, 2008 (JP) ................................. 2008-132536

(51) Int. Cl.
*G06F 7/00* (2006.01)
*G06F 17/00* (2006.01)
*G06F 19/00* (2011.01)

(52) U.S. Cl. ......................................................... 701/56
(58) Field of Classification Search .................... 701/56; 477/98; 407/98
See application file for complete search history.

(56) References Cited

U.S. PATENT DOCUMENTS

| | | | | |
|---|---|---|---|---|
| 5,556,349 | A | * | 9/1996 | Ishii et al. ........................ 477/76 |
| 5,593,364 | A | * | 1/1997 | Ishii et al. ........................ 477/98 |
| 6,421,596 | B2 | * | 7/2002 | Lee ................................. 701/51 |
| 6,466,854 | B1 | | 10/2002 | Henneken et al. |
| 2002/0065595 | A1 | * | 5/2002 | Shin ................................ 701/50 |

FOREIGN PATENT DOCUMENTS

| | | |
|---|---|---|
| JP | 6-272754 | 9/1994 |
| JP | 10-181385 | 7/1998 |
| JP | 2003-207038 | 7/2003 |

* cited by examiner

*Primary Examiner* — Mary Cheung
*Assistant Examiner* — Michael D Lang
(74) *Attorney, Agent, or Firm* — Oblon, Spivak, McClelland, Maier & Neustadt, L.L.P.

(57) ABSTRACT

A shift controller includes: a shift control unit automatically shifting gears of an automatic transmission using a basic shift line map; a shift line map switching control unit switching from the basic shift line map to a high fluid temperature shift line map set on a lower vehicle speed side when a hydraulic fluid temperature in the automatic transmission is higher than a predetermined value; and a low power state determination unit determining whether a vehicle is in a low power state in which a required power related value used for gear shift determination is lower than a predetermined determination value. The shift line map switching control unit switches from the high fluid temperature shift line map back to the basic shift line map when the hydraulic fluid temperature is lower than the predetermined value and the vehicle is in the low power state.

15 Claims, 9 Drawing Sheets

|     | C1 | C2 | B1 | B2  | B3 | F1 |
|-----|----|----|----|-----|----|----|
| 1st | O  |    |    | (O) |    | △  |
| 2nd | O  |    | O  |     |    |    |
| 3rd | O  |    |    |     | O  |    |
| 4th | O  | O  |    |     |    |    |
| 5th |    | O  |    |     | O  |    |
| 6th |    | O  | O  |     |    |    |
| R   |    |    |    | O   | O  |    |
| N   |    |    |    |     |    |    |

(O) : OPERATED DURING ENGINE BRAKE

△ : OPERATED ONLY DURING DRIVING

SHIFT CONTROLLER OF VEHICLE AUTOMATIC TRANSMISSION

INCORPORATION BY REFERENCE

The disclosure of Japanese Patent Application No. 2008-132536 filed on May 20, 2008 including the specification, drawings and abstract is incorporated herein by reference in its entirety.

BACKGROUND OF THE INVENTION

1. Field of the Invention

The invention relates to a high-temperature shift line switching control in which a shift line for automatic shift control is shifted to a lower speed side when the hydraulic fluid temperature of an automatic transmission is high in a vehicle equipped with the automatic transmission.

2. Description of the Related Art

A known shift controller of a vehicle automatic transmission includes a shift control unit and a shift line map switching control unit. The shift control unit automatically shifts gears of the automatic transmission on the basis of a vehicle state by referring to a prestored basic shift line map. When the hydraulic fluid temperature in the automatic transmission is higher than a predetermined fluid temperature determination value, the shift line map switching control unit switches from the basic shift line map to a high fluid temperature shift line map that is set on a lower speed side with respect to the basic shift line map. Japanese Patent Application Publication No. 2003-207038 (JP-A-2003-207038), for example, describes such a shift controller of a vehicle automatic transmission.

According to the above shift controller, when the hydraulic fluid temperature in the automatic transmission is higher than a predetermined fluid temperature determination value, the shift line map switching control unit switches from the basic shift line map to the high fluid temperature shift line map that is set on a lower vehicle speed side with respect to the basic shift line map. This promotes the automatic transmission to upshift to decrease the rotational speed of an input rotating member, resulting in a decrease in fluid temperature.

However, in the above existing shift controller of the vehicle automatic transmission, when, for example, the shift line map switching control unit switches from the basic shift line map to the high fluid temperature shift line map and, as a result, the hydraulic fluid temperature in the automatic transmission is decreased, the shift line map switching control unit switches from the high fluid temperature shift line map back to the basic shift line map. In that case, there is inconvenience that the automatic transmission unexpectedly downshifts because of the switching of the shift line map to make a driver feel uncomfortable. That is, a downshift line for determining whether to downshift between predetermined gears in the basic shift line map and an upshift line for determining whether to upshift between those predetermined gears in the high fluid temperature shift line map intersect with each other or are adjacent to each other. Thus, when the vehicle state falls within a higher speed side region with respect to the high fluid temperature shift line because of switching back to the basic shift line map, there is a case where a point that indicates a vehicle running state represented by a vehicle speed and a required power related value relatively crosses over a downshift line toward a lower vehicle speed side in the shift line map and, therefore, the automatic transmission unexpectedly downshifts.

SUMMARY OF THE INVENTION

The invention provides a shift controller of a vehicle automatic transmission that does not make a driver feel uncomfortable because of unexpected downshift in regard to switching from a high fluid temperature shift line map back to a basic shift line map.

An aspect of the invention provides a shift controller of a vehicle automatic transmission. The shift controller includes: a shift control unit that automatically shifts gears of the automatic transmission on the basis of a vehicle state by referring to a prestored basic shift line map; a shift line map switching control unit that switches from the basic shift line map to a high fluid temperature shift line map that is set on a lower vehicle speed side with respect to the basic shift line map when a hydraulic fluid temperature in the automatic transmission is higher than a predetermined fluid temperature determination value; and a low power state determination unit that determines whether a vehicle is in a low power state in which a required power related value of the vehicle, used for gear shift determination in the shift control unit, is lower than a predetermined low power determination value. The shift line map switching control unit switches from the high fluid temperature shift line map back to the basic shift line map when the hydraulic fluid temperature in the automatic transmission is lower than the fluid temperature determination value and when the low power state determination unit determines that the vehicle is in the low power state.

With the above shift controller, the shift controller includes a low power state determination unit that determines whether a vehicle is in a low power state in which a required power related value of the vehicle, used for gear shift determination in the shift control unit, is lower than a predetermined low power determination value, and the shift line map switching control unit switches from the high fluid temperature shift line map back to the basic shift line map when the hydraulic fluid temperature in the automatic transmission is lower than the fluid temperature determination value and when the low power state determination unit determines that the vehicle is in the low power state. A downshift line for determining whether to downshift between predetermined gears in the basic shift line map and a downshift line for determining whether to downshift between the predetermined gears in the high fluid temperature shift line map coincide with each other or are adjacent to each other in a lower power region with respect to the low power determination value. Thus, when the shift line map is switched from the high fluid temperature shift line map back to the basic shift line map, the shift controller prevents the automatic transmission from unexpectedly downshifting because of the switching of the shift line map to suitably avoid driver's uncomfortable feeling due to the unexpected downshift.

In addition, in the shift controller, a downshift line for determining whether to downshift between predetermined gears in the basic shift line map and a downshift line for determining whether to downshift between the predetermined gears in the high fluid temperature shift line map may substantially coincide with each other in a lower power region with respect to the low power determination value, and may differ from each other in a higher power region with respect to the low power determination value.

With the above shift controller, a downshift line for determining whether to downshift between predetermined gears in the basic shift line map and a downshift line for determining whether to downshift between the predetermined gears in the high fluid temperature shift line map substantially coincide with each other in a lower power region with respect to the low power determination value, and differ from each other in a higher power region with respect to the low power determination value. Thus, when the shift line map switching control unit switches from the high fluid temperature shift line map back to the basic shift line map, the shift controller prevents the automatic transmission from unexpectedly downshifting because of the switching of the shift line map to suitably avoid driver's uncomfortable feeling due to the unexpected downshift.

In addition, in the shift controller, a downshift line for determining whether to downshift between predetermined gears in the basic shift line map and an upshift line for determining whether to upshift between the predetermined gears in the high fluid temperature shift line map may intersect with each other in the higher power region with respect to the low power determination value.

With the above shift controller, a downshift line for determining whether to downshift between predetermined gears in the basic shift line map and an upshift line for determining whether to upshift between the predetermined gears in the high fluid temperature shift line map intersect with each other in the higher power region with respect to the low power determination value. Thus, in a state where a vehicle state falls within a range between the downshift line and the upshift line that are on a higher power region with respect to the above intersection, when the shift line map switching control unit switches from the high fluid temperature shift line map back to the basic shift line map, the automatic transmission definitely attempts to unexpectedly downshift in regard to the switching of the shift line map. However, the switching of the shift line map is not allowed until the vehicle state is in a lower power region with respect to the low power determination value, thus preventing the automatic transmission from downshifting in the higher power region with respect to the low power determination value. This suitably avoids driver's uncomfortable feeling due to the unexpected downshift.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, an embodiment of the invention will be described with reference to the accompanying drawings. Note that, in the following embodiment, the drawings are appropriately simplified or modified, and the scale ratio, shape, and the like, of the components are not always drawn accurately.

Figures 1, 2:
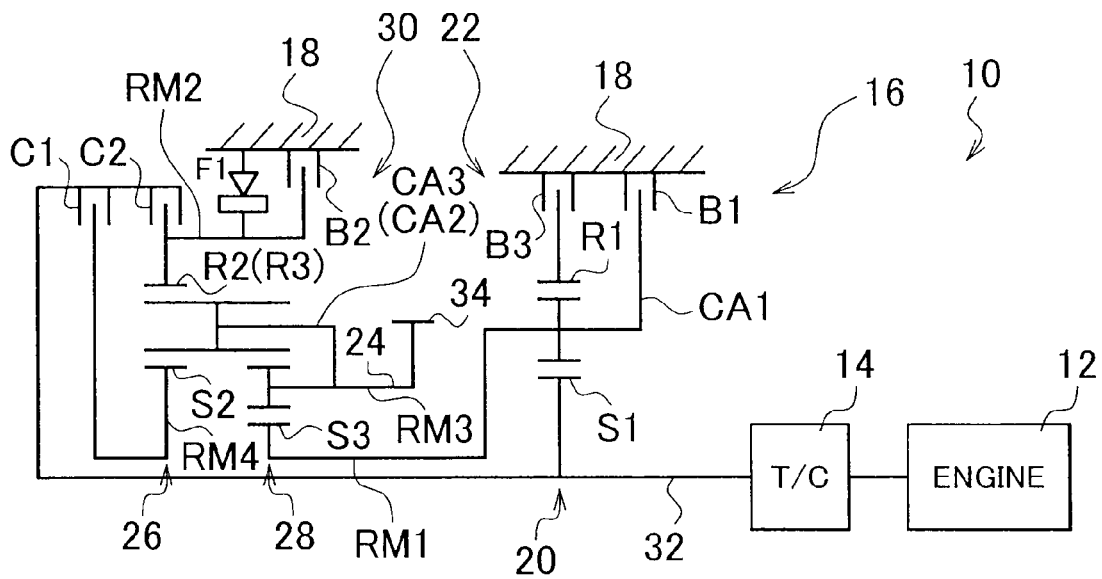
FIG. 1 is a skeleton view that illustrates the schematic configuration of a vehicle power transmission mechanism according to an embodiment of the invention.
FIG. 2 is an engagement operation table that illustrates a combination of operated engagement elements, including clutches, brakes and a one-way clutch, when a plurality of gears having different gear ratios are established in an automatic transmission shown in FIG. 1.

FIG. 1 is a skeleton view that illustrates the schematic configuration of a vehicle power transmission mechanism 10 according to the embodiment of the invention. As shown in FIG. 1, the power transmission mechanism 10 is employed suitably for, for example, a front-engine front-drive (FF) vehicle, and includes an engine 12, which is an internal combustion engine, used as a power source for propelling the vehicle. The power of the engine 12 is transmitted to a differential gear unit (not shown) via a torque converter 14, which serves as a hydraulic transmission device, and an automatic transmission 16, and is then distributed to right and left drive wheels (not shown). The automatic transmission 16 is provided in a power transmission path from the engine 12 to the right and left drive wheels.

The automatic transmission 16 includes a first gear shift unit 22 and a second gear shift unit 30 that are coaxially arranged along a common axis in a transmission case (hereinafter, referred to as case), which serves as a non-rotating member, secured to a vehicle body. The first gear shift unit 22 is mainly formed of a single pinion first planetary gear set 20. The second gear shift unit 30 is mainly formed of a single pinion second planetary gear set 26 and a double pinion third planetary gear set 28. The automatic transmission 16 changes the speed of rotation input from an input shaft 32 thereof and outputs the rotation from an output shaft 24 thereof. The input shaft 32 is a turbine shaft of the torque converter 14, which is driven for rotation by the engine 12. The engine 12 is a power source for propelling the vehicle. As described above, an output gear 34 connected to the output shaft 24, for example, drives right and left drive wheels for rotation sequentially through a differential gear unit (not shown), a pair of axles, and the like. Note that the automatic transmission 16 is formed substantially symmetrically with respect to the axis of the input shaft 32, that is, the common axis, and in the skeleton diagram of FIG. 1, the lower half of the automatic transmission 16 below the axis is omitted.

The first planetary gear set 20 of the first gear shift unit 22 includes three rotating elements, that is, a sun gear S1, a carrier CA1 and a ring gear R1. The sun gear S1 is coupled to the input shaft 32 and driven for rotation, while the ring gear R1 is fixed to the case 18 via a brake B3 so that it is not rotatable. Thus, the carrier CA1 serves as an intermediate output member, and is rotated at a lower speed than that of the input shaft 32 to output the rotation.

Portions of the second planetary gear set 26 and third planetary gear set 28 of the second gear shift unit 30 are connected to each other to constitute four rotating elements RM1 to RM4. Specifically, a sun gear S3 of the third planetary gear set 28 constitutes the rotating element RM1, a ring gear R2 of the second planetary gear set 26 and a ring gear R3 of the third planetary gear set 28 are coupled to each other to constitute the rotating element RM2, a carrier CA2 of the second planetary gear set 26 and a carrier CA3 of the third planetary gear set 28 are coupled to each other to constitute the rotating element RM3, and a sun gear S2 of the second planetary gear set 26 constitutes the rotating element RM4. The second planetary gear set 26 and the third planetary gear set 28 form a Ravigneaux planetary gear train in which the carriers CA2 and CA3 are formed of a common member, the ring gears R2 and R3 are formed of a common member and the pinions of the second planetary gear set 26 also serve as second pinions of the third planetary gear set 28. The first rotating element RM1 is integrally coupled to the carrier CA1 of the first planetary gear set 20, which is an intermediate output member, and is rotated or stopped by being selectively coupled to the case 18 by a brake B1. The second rotating element RM2 is rotated or stopped by being selectively coupled to the case 18 by a brake B2 or a one-way clutch F1, and is selectively coupled to the input shaft 32 via a second clutch C2. The fourth rotating element RM4 is selectively coupled to the input shaft 32 via a clutch C1. The third rotating element RM3 is integrally coupled to the output gear 34 to output the rotation.

The clutches C1 and C2 and the brakes B1, B2 and B3 (hereinafter, referred to as clutches C and brakes B when it is not necessary to distinguish them from one another) are hydraulic frictional engagement elements, such as multiple disk clutches or multiple disk brakes, that are controlled for engagement by hydraulic pressures supplied to hydraulic actuators ACT1 to ACT5 (see FIG. 3) provided respectively for the clutches C and the brakes B. The automatic transmission 16 selectively engages the clutches C and the brakes B as shown in the engagement operation table shown in FIG. 2 in accordance with an operating position of a shift lever 64 of a shift operating device 62, which will be described later, to establish six forward gears and one reverse gear having different gear ratios (values obtained by dividing the input shaft rotational speed of the automatic transmission 16 by the output shaft rotational speed thereof). As shown in FIG. 2, "1st" to "6th" respectively mean forward first gear to sixth gear, "R" means a reverse gear and "N" means neutral in which the power transmission path is interrupted. In addition, the circle represents an engaged state, the circle in parentheses represents an engaged state only during engine brake, the triangle represents an engaged state only during driving, and the blank represents a released state. Note that the gear ratios of the "1st" to "6th" and "R" are determined so as to sequentially decrease using the gear ratios of the first planetary gear set 20, second planetary gear set 26 and third planetary gear set 28.

Figure 3:
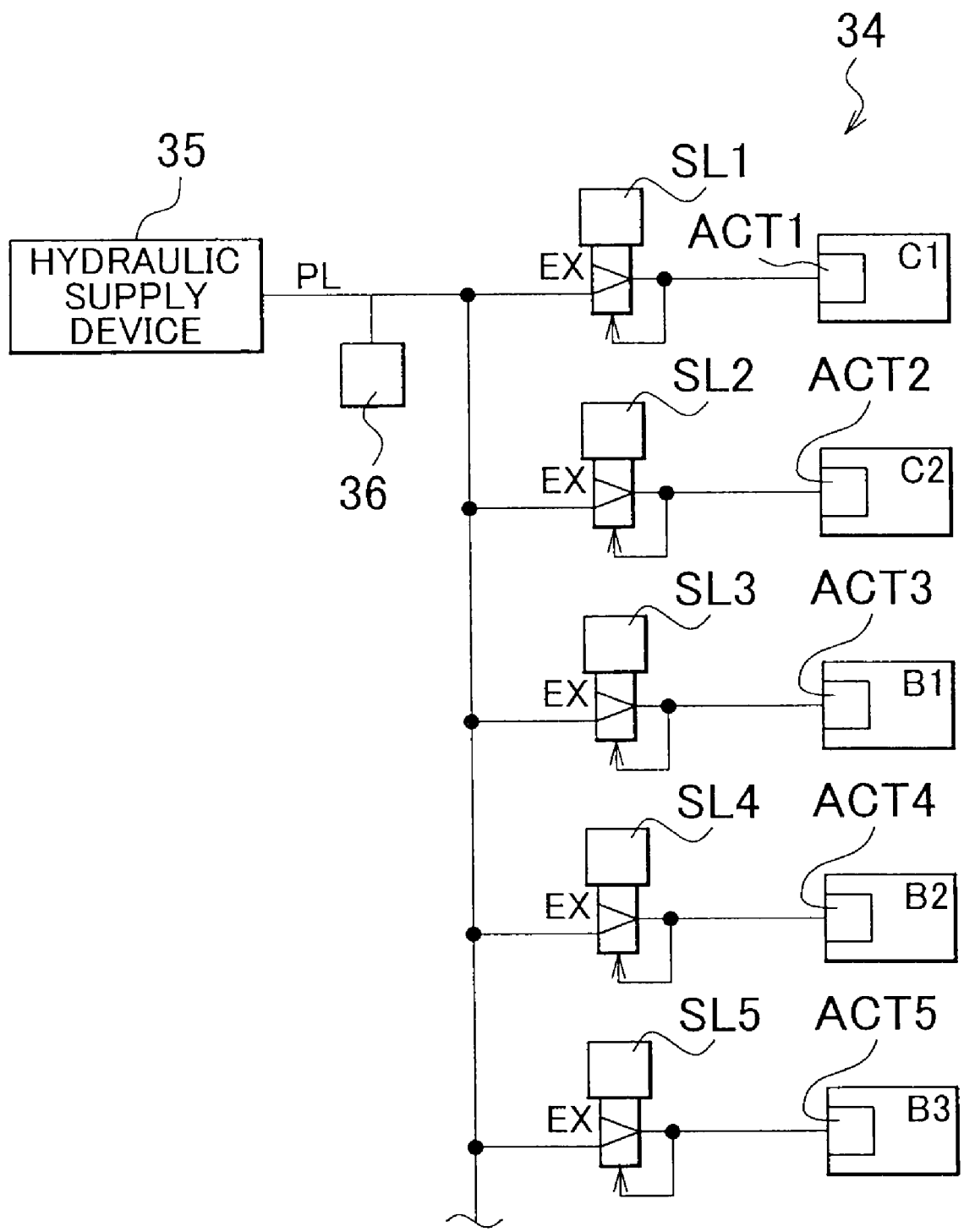
FIG. 3 is a circuit diagram that shows a relevant portion of a hydraulic control circuit for controlling hydraulic pressures supplied to hydraulic actuators provided respectively for the clutches and brakes shown in FIG. 1.

FIG. 3 is a circuit diagram that shows a relevant portion of a hydraulic control circuit 34 for controlling hydraulic pressures supplied to the hydraulic actuators (hydraulic cylinders) ACT1 to ACT5 provided respectively for the clutches C and the brakes B. As shown in FIG. 3, the hydraulic control circuit 34 includes linear solenoid valves SL1 to SL5 (hereinafter, referred to as linear solenoid valves SL when it is not necessary to distinguish them from one another), a hydraulic supply device 35, and a fluid temperature sensor 36. The linear solenoid valves SL1 to SL5 are provided in correspondence with the hydraulic actuators ACT1 to ACT5. The hydraulic supply device 35 supplies a line pressure PL to those linear solenoid valves SL. The fluid temperature sensor 36 is provided between the hydraulic supply device 35 and the linear solenoid valves SL. The fluid temperature sensor 36 detects a hydraulic fluid temperature $T_{OIL}$ in the hydraulic control circuit 34, and supplies a signal that indicates the hydraulic fluid temperature $T_{OIL}$ to the electronic control unit 38, which will be described later. The linear solenoid valves SL1 to SL5 basically have the same configuration. The linear solenoid valves SL1 to SL5 are independently excited, deexcited or current-controlled by the electronic control unit 38, which will be described later, to independently and continuously regulate hydraulic pressures supplied to the hydraulic actuators ACT1 to ACT5, thus controlling engagement pressures of the clutches C and brakes B, respectively. In addition, the hydraulic supply device 35 is formed of a solenoid valve, a linear solenoid valve, an open/close valve, a pressure regulating valve, and the like. The solenoid valve is excited by the electronic control unit 38, which will be described later, to open or close a fluid passage. The linear solenoid valve controls hydraulic pressure. The open/close valve opens or closes a fluid passage and controls hydraulic pressure in accordance with signal pressures output from those solenoid valve and the linear solenoid valve. The hydraulic supply device 35 is, for example, mounted on a pump shaft, or the like, of the torque converter 14, and regulates the line pressure PL in response to an engine load, or the like, on the basis of a hydraulic pressure generated by a mechanical hydraulic pump (not shown) that is driven by the engine 12 for rotation.

Figure 4:
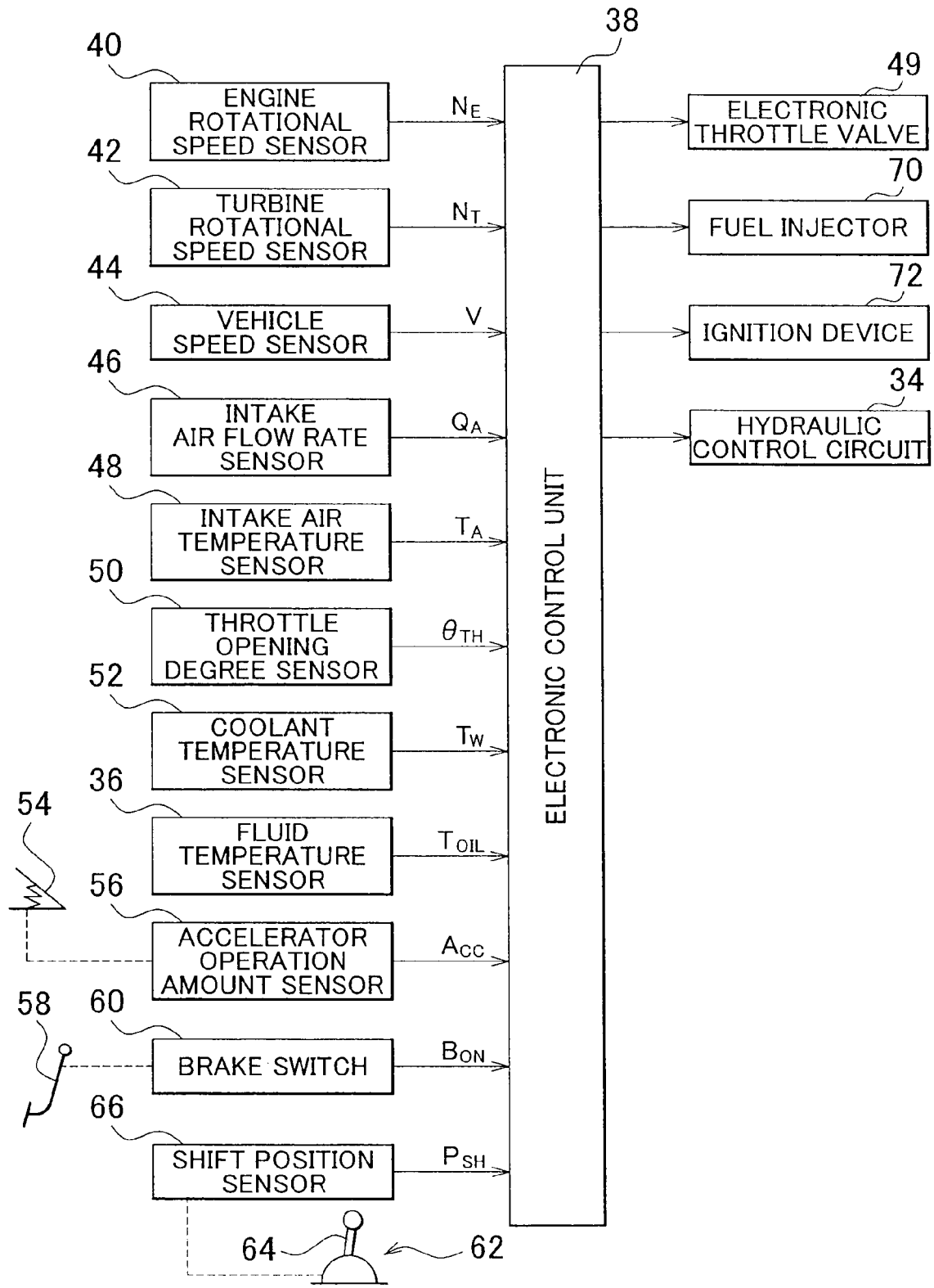
FIG. 4 is a block diagram that illustrates a relevant portion of a control system provided for a vehicle in order to control the automatic transmission, an engine, and the like, shown in FIG. 1.

FIG. 4 is a block diagram that illustrates a relevant portion of a control system provided for the vehicle in order to control the automatic transmission 16, the engine 12, and the like, shown in FIG. 1. As shown in FIG. 4, the electronic control unit 38 is formed to include a so-called microcomputer provided with a CPU, a RAM, a ROM, an input/output interface, and the like, and utilizes the temporary storage function of the RAM while carrying out signal processing in accordance with a program stored in the ROM beforehand to thereby execute power control of the engine 12, gear shift control of the automatic transmission 16, and the like. Note that the electronic control unit 38 is separately formed of a unit for power control and a unit for gear shift control where necessary.

The electronic control unit 38 is connected to an engine rotational speed sensor 40, a turbine rotational speed sensor 42, a vehicle speed sensor 44, an intake air flow rate sensor 46, an intake air temperature sensor 48, a throttle opening degree sensor 50, a coolant temperature sensor 52, a fluid temperature sensor 36, an accelerator operation amount sensor 56, a brake switch 60, a shift position sensor 66, and the like. The engine rotational speed sensor 40 detects en engine rotational speed $N_E$ (rpm) of the engine 12. The turbine rotational speed sensor 42 detects an input shaft rotational speed of the automatic transmission 16, that is, a turbine rotational speed $N_T$ (rpm) of the torque converter 14. The vehicle speed sensor 44 detects a vehicle speed V (km/h) corresponding to an output shaft rotational speed of the automatic transmission 16. The intake air flow rate sensor 46 detects an intake air flow rate $Q_A$ (m$^3$/sec) of the engine 12. The intake air temperature sensor 48 detects an intake air temperature $T_A$ (° C.) of the engine 12. The throttle opening degree sensor 50 detects a throttle opening degree $\theta_{TH}$ (%) corresponding to an opening degree of an electronic throttle valve 49 provided for an intake pipe (not shown) of the engine 12. The coolant temperature sensor 52 detects a temperature of coolant used for cooling the engine 12, and the like, that is, a coolant temperature $T_W$ (° C.). The fluid temperature sensor 36 detects a temperature of hydraulic fluid in the hydraulic control circuit 34, that is, a hydraulic fluid temperature $T_{OIL}$ (° C.). The accelerator operation amount sensor 56 detects an amount by which an accelerator pedal is depressed, that is, an accelerator operation amount Acc (%). The brake switch 60 detects a brake operation signal $B_{ON}$ that indicates that a brake pedal 58, which is an input member of a foot brake, is operated. The shift position sensor 66 detects a shift position (operating position) $P_{SH}$ of the shift lever 64, which serves as an input member of the shift operating device 62. The electronic control unit 38 is supplied from the above sensors and switch with signals that indicate an engine rotational speed $N_E$, a turbine rotational speed $N_T$, a vehicle speed V (km/h), an intake air flow rate $Q_A$, an intake air temperature $T_A$, a throttle opening degree $\theta_{TH}$, a coolant temperature $T_W$, a hydraulic fluid temperature $T_{OIL}$, an accelerator operation amount Acc, a brake operation signal $B_{ON}$, a shift position $P_{SH}$, and the like.

In addition, an engine power control command signal for power control of the engine 12 is output from the electronic control unit 38. The engine power control command signal, for example, includes a throttle signal by which a throttle actuator is driven to control open/close of the electronic throttle valve 49, an injection signal for controlling the amount of fuel injected from a fuel injector 70, and an ignition timing signal for controlling ignition timing of the engine 12 by an ignition device 72. In addition, an output signal for gear shift control of the automatic transmission 16 is supplied from the electronic control unit 38. The output signal, for example, includes a valve command signal by which the linear solenoid valve SL in the hydraulic control circuit 34 is operated to switch in order to shift gears of the automatic transmission 16, a command signal supplied to the hydraulic supply device 35 for controlling the line hydraulic pressure PL, and the like.

Figure 5:
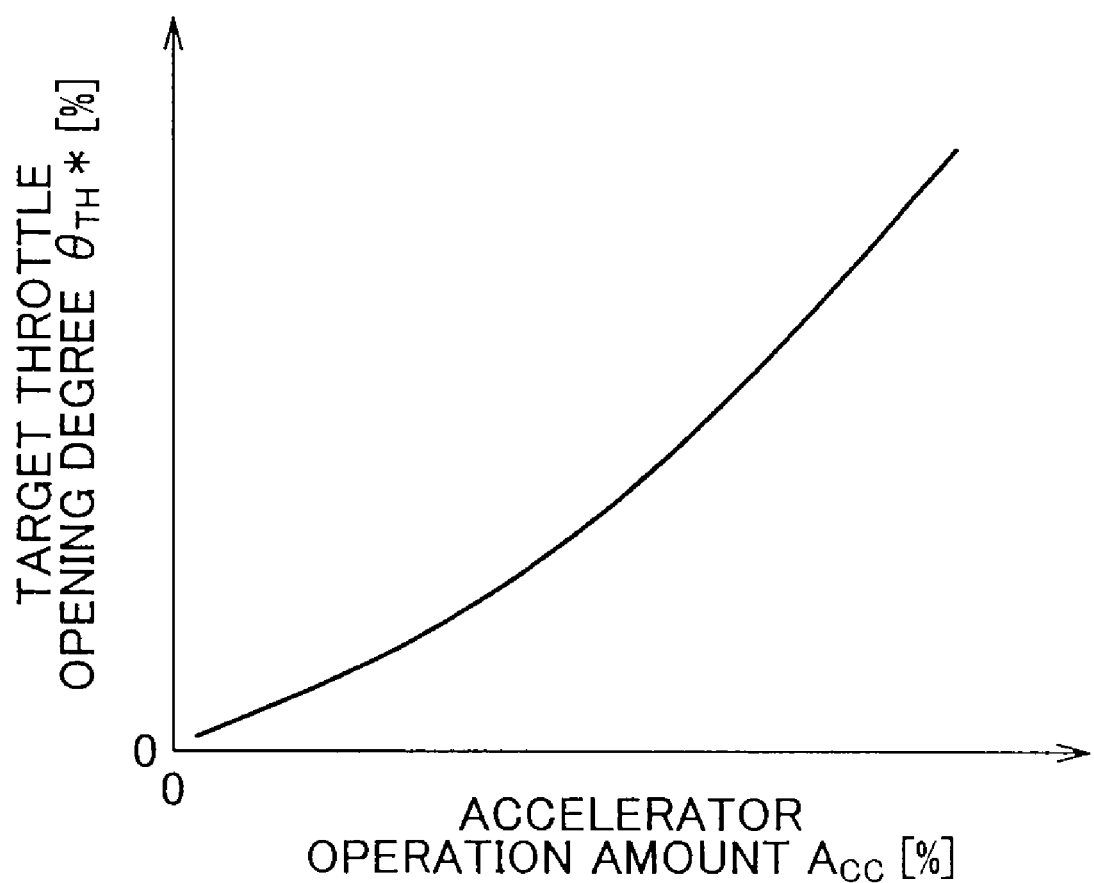
FIG. 5 is a graph that shows a predetermined and prestored relationship between an accelerator operation amount and a target throttle opening degree.

In the gear shift control of the automatic transmission 16, for example, a target throttle opening degree $\theta_{TH}^*$ (%) is calculated on the basis of an actual accelerator operation amount Acc by referring to a predetermined and prestored relationship (map) between a target throttle opening degree $\theta_{TH}^*$ (%) and an accelerator operation amount Acc as shown in FIG. 5, a gear to which the automatic transmission 16 is shifted is determined on the basis of an actual vehicle speed V and the calculated target throttle opening degree $\theta_{TH}^*$ by referring to a prestored shift line map (shift map) formed of a plurality of shift lines set on the two-dimensional coordinates of vehicle speed axis and throttle opening degree axis, and engagement/release states of the clutches C and brakes B are switched in accordance with the prestored engagement operation table shown in FIG. 2 in order to establish the determined gear. Engagement/release states of the clutches C and brakes B are switched in such a manner that engagement pressures of the clutches C and brakes B are continuously controlled by controlling the linear solenoid valves SL of the hydraulic control circuit 34 in order to prevent occurrence of a shift shock, such as a variation in driving force, and a loss of durability of frictional materials. Note that the gear shift control may be implemented in various modes, for example, the gear shift control may be performed on the basis of an accelerator operation amount Acc, an intake air flow rate $Q_A$, a road surface gradient, or the like.

Figure 6:
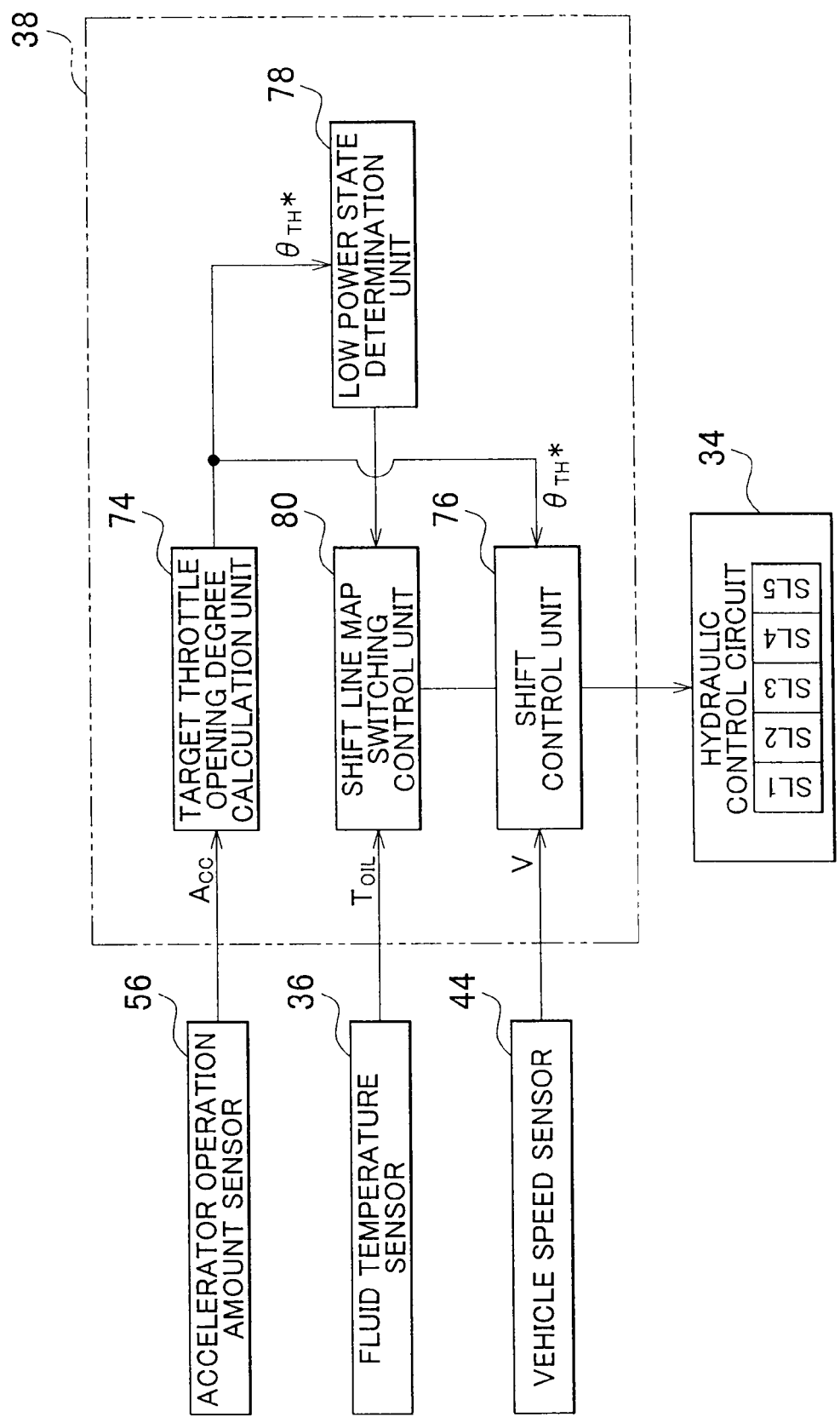
FIG. 6 is a functional block diagram that illustrates a relevant portion of a control function of an electronic control unit that also functions as a shift controller that executes gear shift control over the automatic transmission shown in FIG. 1.

FIG. 6 is a functional block diagram that illustrates a relevant portion of a control function of the electronic control unit 38 that also functions as the shift controller that executes gear shift control over the automatic transmission 16. As shown in FIG. 6, a target throttle opening degree calculation unit 74 calculates a target throttle opening degree $\theta_{TH}^*$ on the basis of an actual accelerator operation amount Acc by referring to a predetermined and prestored relationship between a target throttle opening degree $\theta_{TH}^*$ (%) and an accelerator operation amount Acc as shown in FIG. 5. The target throttle opening degree $\theta_{TH}^*$ is used for shift determination, that is, determination of a gear to which the automatic transmission 16 is shifted, in a shift control unit 76, which will be described later. The target throttle opening degree $\theta_{TH}^*$ corresponds to a required power related value of the vehicle.

Figure 7:
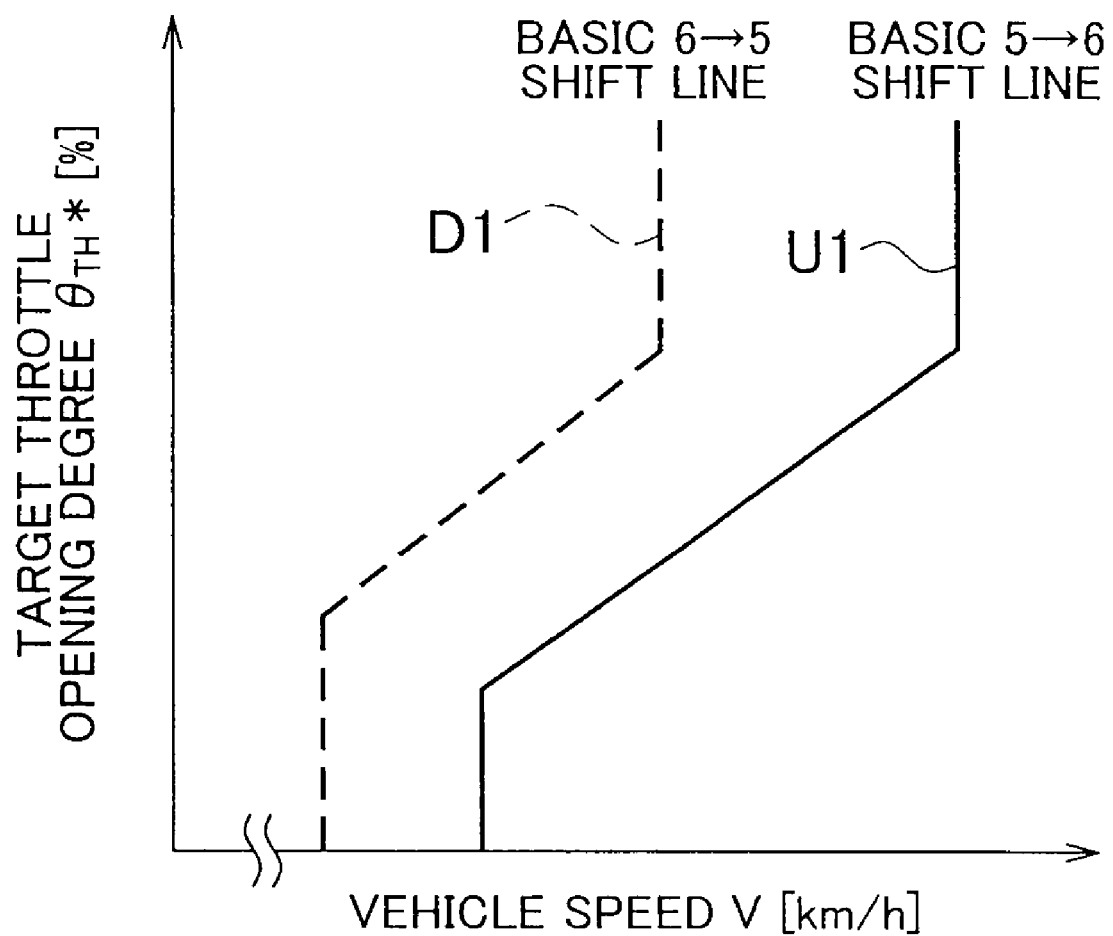
FIG. 7 is a view that shows a basic shift line map from among prestored shift line maps, each of which is formed of a plurality of shift lines set in the two-dimensional coordinates of vehicle speed axis and throttle opening degree axis.
Figure 8:
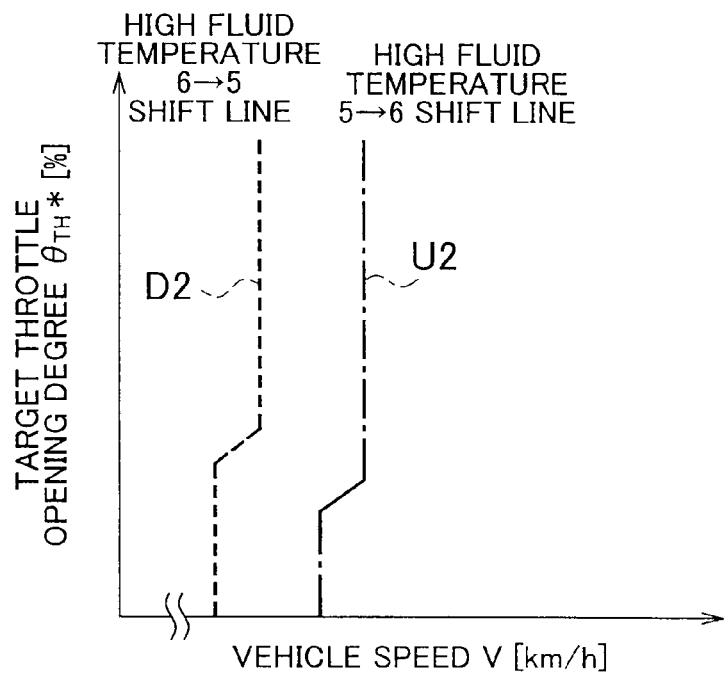
FIG. 8 is a view that shows a high fluid temperature shift line map from among the prestored shift line maps, each of which is formed of a plurality of shift lines set in the two-dimensional coordinates of vehicle speed axis and throttle opening degree axis.

The shift control unit 76, for example, determines whether to shift gears on the basis of a vehicle speed V and a target throttle opening degree $\theta_{TH}^*$ by referring to a prestored shift line map shown in FIG. 7 or FIG. 8, and then automatically shifts gears of the automatic transmission 16. The vehicle speed V and the target throttle opening degree $\theta_{TH}^*$ correspond to a vehicle state value that indicates a vehicle state on a shift line map, which is Cartesian coordinates of the axis indicating a vehicle speed V and the axis indicating a throttle opening degree. Here, the above shift line map includes the basic shift line map shown in FIG. 7 and the high fluid temperature shift line map shown in FIG. 8. In the high fluid temperature shift line map, shift lines are set on a lower speed side than those of the basic shift line map. As shown in FIG. 7 and FIG. 8, the basic shift line map and the high fluid temperature shift line map each are formed of a plurality of shift lines for determining whether to shift between gears. The plurality of shift lines are set in the two-dimensional coordinates of the vehicle axis and the throttle opening degree axis. These are empirically obtained in advance. In the present embodiment, when a hydraulic fluid temperature $T_{OIL}$ of the hydraulic control circuit 34 in the automatic transmission 16 is lower than or equal to a predetermined and prestored fluid temperature determination value $T_{OIL}1$, the basic shift line map shown in FIG. 7 is used. However, when the hydraulic fluid temperature $T_{OIL}$ is higher than the fluid temperature determination value $T_{OIL}1$, the shift line map is switched to the high fluid temperature shift line map shown in FIG. 8. This switching is performed by a shift line map switching control unit 80, which will be described later. In addition, the fluid temperature determination value $T_{OIL}1$ is empirically obtained in advance as a hydraulic fluid temperature at or above which it is necessary to suppress the amount of heat generated by the automatic transmission 16. Note that FIG. 7 and FIG. 8 respectively show only 5-6 shift lines (upshift lines) U1 and U2 for determining whether to upshift from the fifth gear to the sixth gear and 6-5 shift lines (downshift lines) D1 and 2 for determining whether to downshift from the sixth gear to the fifth gear among the plurality of shift lines, and the other shift lines are omitted.

The 5-6 shift lines U1 and U2 regulate a shift timing at which the gear is shifted to a higher vehicle speed side. That is, as a position that indicates a vehicle running state determined by an actual vehicle speed V and a target throttle opening degree $\theta_{TH}^*$ calculated by the target throttle opening degree calculation unit 74 relatively crosses over the 5-6 shift line U1 indicated by the solid line in the basic shift line map shown in FIG. 7 to a higher vehicle speed side or as a position that indicates the vehicle running state relatively crosses over the 5-6 shift line U2 indicated by the alternate long and short dashed line in the high fluid temperature shift line map shown in FIG. 8 to a higher vehicle speed side, the shift control unit 76 determines to shift from the fifth gear to the sixth gear and then engages the brake B1 while releasing the brake B3 as shown in FIG. 2. Note that as a position that indicates the vehicle running state crosses over a 1-2 shift line, a 2-3 shift line, a 3-4 shift line or a 4-5 shift line (not shown) to a higher vehicle speed side, the shift control unit 76 determines to shift to the second gear, the third gear, the fourth gear or the fifth gear and then controls the clutches C and the brakes B for engagement as shown in FIG. 2.

The 6-5 shift lines D1 and D2 regulate a shift timing at which the gear is shifted to a lower vehicle speed side. That is, as a position that indicates a vehicle running state determined by an actual vehicle speed V and a target throttle opening degree $\theta_{TH}^*$ calculated by the target throttle opening degree calculation unit 74 crosses over the 6-5 shift line D1 indicated by the broken line in the basic shift line map shown in FIG. 7 to a lower vehicle speed side or as a position that indicates the vehicle running state crosses over the 6-5 shift line D2 indicated by the dotted line in the high fluid temperature shift line map shown in FIG. 8 to a lower vehicle speed side, the shift control unit 76 determines to shift from the sixth gear to the fifth gear and then engages the brake B3 while releasing the brake B1 as shown in FIG. 2. Note that as a position that indicates the vehicle running state crosses over a 2-1 shift line, a 3-2 shift line, a 4-3 shift line or a 5-4 shift line (not shown) to a lower vehicle speed side, the shift control unit 76 determines to shift to the first gear, the second gear, the third gear or the fourth gear and then controls the clutches C and the brakes B for engagement as shown in FIG. 2.

Figure 9:
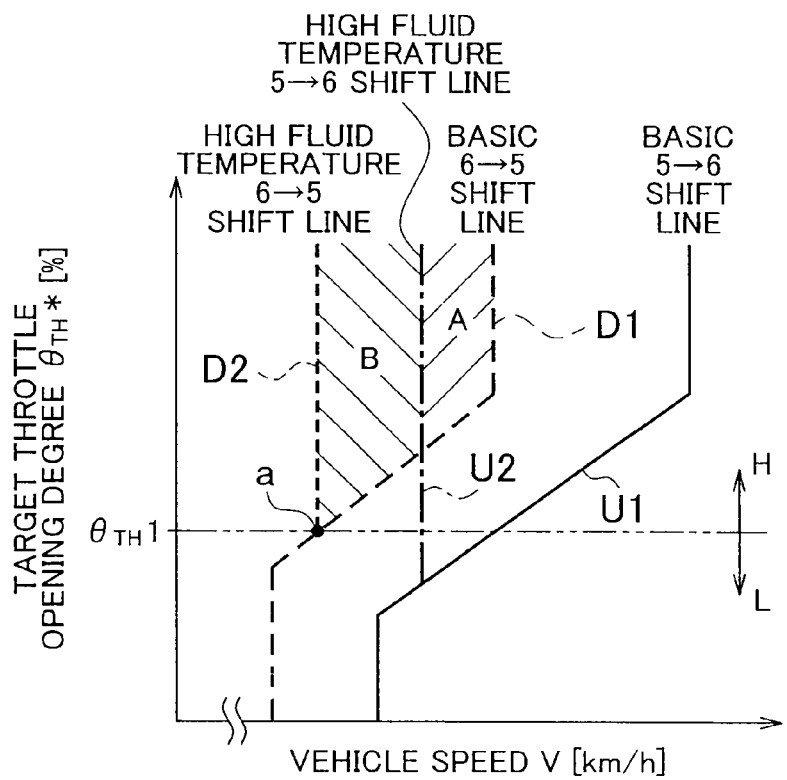
FIG. 9 is a view that overlappingly shows the basic shift line map shown in FIG. 7 and the high fluid temperature shift line map shown in FIG. 8 with respect to the same axes.

Referring back to FIG. 6, a low power state determination unit 78 determines whether the vehicle is in a low power state in which the target throttle opening degree $\theta_{TH}^*$ calculated by the target throttle opening degree calculation unit 74 is lower than a predetermined and prestored low power determination value. Here, in the present embodiment, a shift line for determining whether to downshift between predetermined gears in the basic shift line map and a shift line for determining whether to downshift between the predetermined gears in the high fluid temperature shift line map coincide with each other in a lower power region L with respect to the low power determination value $\theta_{TH}1$, and differ from each other in a higher power region H with respect to the low power determination value $\theta_{TH}1$. In other words, the low power determination value $\theta_{TH}1$ in the present embodiment is set to a value corresponding to a throttle opening degree $\theta_{TH}$ at a branch point of a shift line for determining whether to downshift between predetermined gears in the basic shift line map and a shift line for determining whether to downshift between the predetermined gears in the high fluid temperature shift line map. Hereinafter, this will be specifically described. FIG. 9 is a view that overlappingly shows the basic shift line map shown in FIG. 7 and the high fluid temperature shift line map shown in FIG. 8 on the same axes. As shown in FIG. 9, the 6-5 shift line D1 in the basic shift line map and the 6-5 shift line D2 in the high fluid temperature shift line map coincide with each other in the lower power region L with respect to the low power determination value $\theta_{TH}1$, and differ from each other in the higher power region H with respect to the low power determination value $\theta_{TH}1$. That is, when a position that indicates a vehicle running state falls within a region on the right to the 6-5 shift line D2 in the high fluid temperature shift line map, the low power determination value $\theta_{TH}1$ is set to a value corresponding to a target throttle opening degree $\theta_{TH}^*$ at a branch point a of the 6-5 shift line D1 in the basic shift line map and the 6-5 shift line D2 in the high fluid temperature shift line map.

Note that, when a position that indicates a vehicle running state falls within a region on the right to the 5-4 shift line in the high fluid temperature shift line map and within a region on the left to the 6-5 shift line D2, the low power determination value $\theta_{TH}1$ is set to a value corresponding to a target throttle opening degree $\theta_{TH}^*$ at a branch point of the 5-4 shift line in the basic shift line map and the 5-4 shift line in the high fluid temperature shift line map.

In addition, when a position that indicates a vehicle running state falls within a region on the right to the 4-3 shift line and on the left to the 5-4 shift line in the high fluid temperature shift line map, the low power determination value $\theta_{TH}1$ is set to a value corresponding to a target throttle opening degree $\theta_{TH}^*$ at a branch point of the 4-3 shift line in the basic shift line map and the 4-3 shift line in the high fluid temperature shift line map.

Moreover, when a position that indicates a vehicle running state falls within a region on the right to the 3-2 shift line and on the left to the 4-3 shift line in the high fluid temperature shift line map, the low power determination value $\theta_{TH}1$ is set to a value corresponding to a target throttle opening degree $\theta_{TH}^*$ at a branch point of the 3-2 shift line in the basic shift line map and the 3-2 shift line in the high fluid temperature shift line map.

Furthermore, when a position that indicates a vehicle running state falls within a region on the left to the 3-2 shift line in the high fluid temperature shift line map, the low power determination value $\theta_{TH}1$ is set to a value corresponding to a target throttle opening degree $\theta_{TH}^*$ at a branch point of the 2-1 shift line in the basic shift line map and the 2-1 shift line in the high fluid temperature shift line map.

Referring back to FIG. 6, when the hydraulic fluid temperature $T_{OIL}$ of the hydraulic control circuit 34 in the automatic transmission 16 is higher than the predetermined fluid temperature determination value $T_{OIL}1$, the shift line map switching control unit 80 switches the shift line map, used for gear shift determination in the shift control unit 76, to the high fluid temperature shift line map of which shift lines are set on a lower speed side than those of the basic shift line map. In addition, the shift line map switching control unit 80 determines whether the shift line map used for gear shift determination in the shift control unit 76 is the high fluid temperature shift line map. Furthermore, when the above determination is affirmative, that is, when the shift line map used for gear shift determination is the high fluid temperature shift line map, the shift line map switching control unit 80 switches the shift line map used for gear shift determination in the shift control unit 76 from the high fluid temperature shift line map back to the basic shift line map when the hydraulic fluid temperature $T_{OIL}$ is lower than the fluid temperature determination value $T_{OIL}1$ and the low power state determination unit 78 determines that the vehicle is in a low power state.

Incidentally, in the present embodiment, a shift line for determining whether to downshift between predetermined gears in the basic shift line map and a shift line for determining whether to upshift between the predetermined gears in the high fluid temperature shift line map intersect with each other in a higher power region H with respect to the low power determination value $\theta_{TH}1$. Thus, in a state where the gear shift control according to the aspect of the invention is not executed to switch the shift line maps by determining a low power state, for example, when a position that indicates the vehicle running state falls within a region A surrounded by the 6-5 shift line D1 and the 5-6 shift line U2 in FIG. 9, as the shift line map used for gear shift determination is switched from the high fluid temperature shift line map to the basic shift line map, the gear is shifted from the sixth gear to the fifth gear because a position that indicates the vehicle running state falls within a low vehicle speed side with respect to the 6-5 shift line D1. This causes the automatic transmission 16 to unexpectedly downshift. In addition, when a position that indicates the vehicle running state falls within a region B surrounded by the 6-5 shift line D1, the 5-6 shift line U2 and the 6-5 shift line D2 and the vehicle is running at the sixth gear, as the shift line map used for gear shift determination is switched from the high fluid temperature shift line map to the basic shift line map, the automatic transmission 16 shifts from the sixth gear to the fifth gear because a position that indicates the vehicle running state falls within a lower vehicle speed side with respect to the 6-5 shift line D1. This causes the automatic transmission 16 to unexpectedly downshift.

Figure 10:
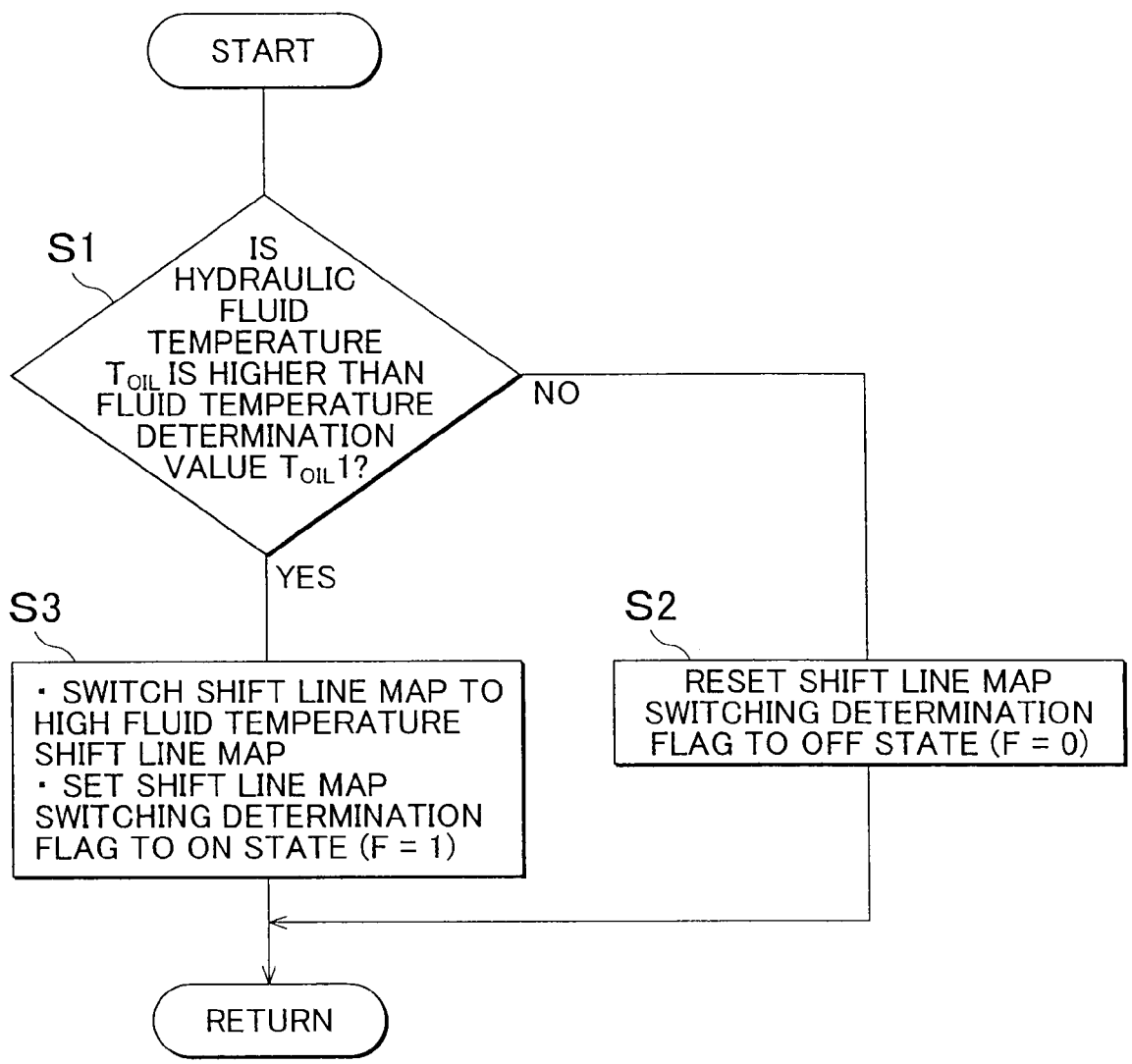
FIG. 10 is a flowchart that illustrates a relevant portion of control operation of the shift controller, executed through signal processing of the electronic control unit shown in FIG. 6.
Figure 11:
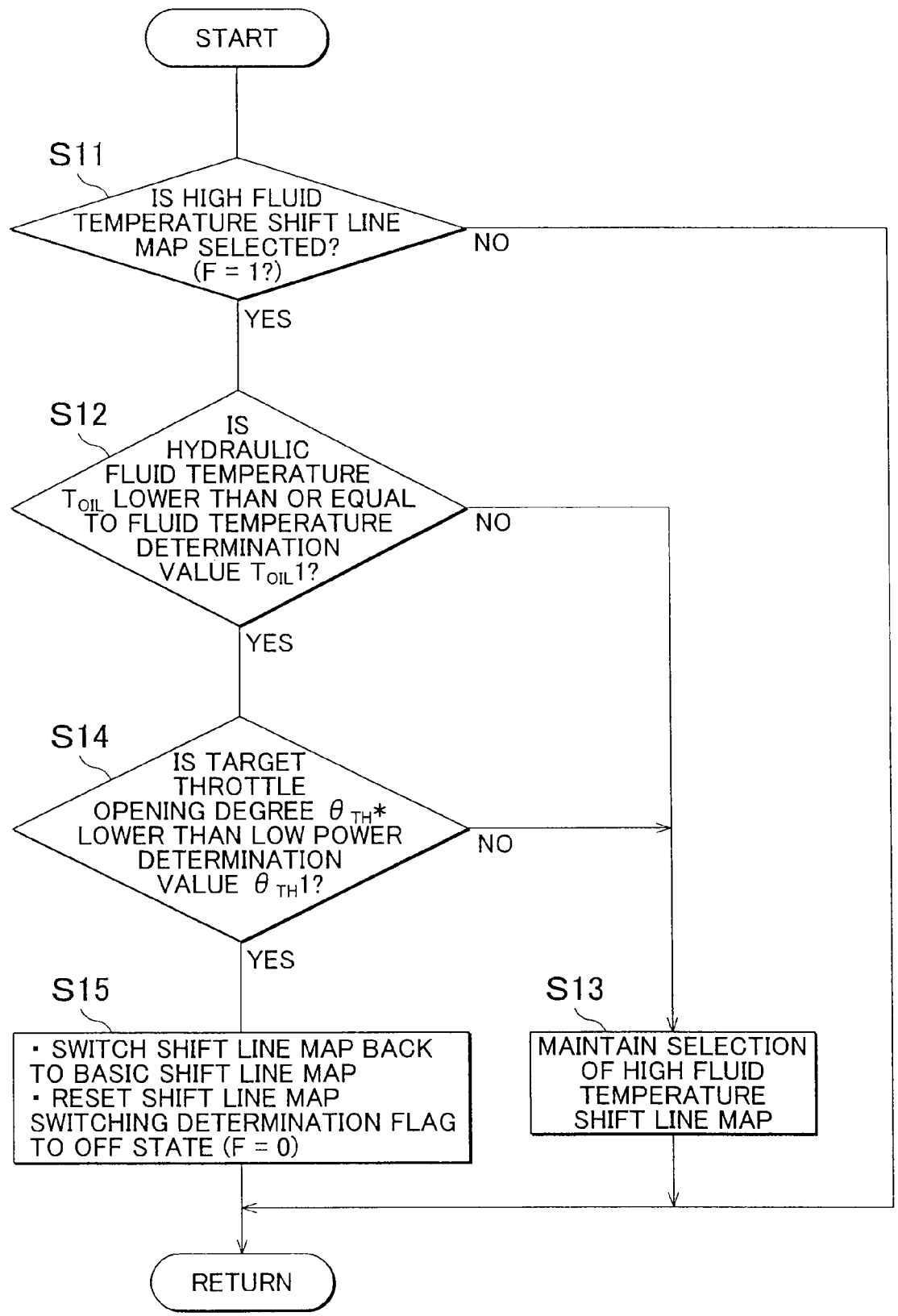
FIG. 11 is a flowchart that illustrates a relevant portion of control operation of the shift controller, executed through signal processing of the electronic control unit shown in FIG. 6.

FIG. 10 and FIG. 11 are flowcharts that illustrate a relevant portion of control operation of the shift controller, executed through signal processing of the electronic control unit 38. That is, these flowcharts each are a series of procedure for switching the shift line map used for gear shift determination on the basis of a vehicle state, and are repeatedly executed, for example, at predetermined intervals of several milliseconds to several tens of milliseconds.

First, FIG. 10 will be described. As shown in FIG. 10, first, in step S1 (hereinafter the word "step" is omitted) corresponding to the shift line map switching control unit 80, it is determined whether an actual hydraulic fluid temperature $T_{OIL}$ exceeds a predetermined fluid temperature determination value $T_{OIL}1$.

When the determination in S1 is negative, in S2 corresponding to the shift line map switching control unit 80, the basic shift line map is maintained as the shift line map used for gear shift determination, and a shift line map switching determination flag F is reset to an off (F=0) state to end the routine. The shift line map switching determination flag F indicates a shift line map switching determination result. That is, when the shift line map switching determination flag F is in an on state, that is, in a set state in which the shift line map switching determination flag F is set at "1", it indicates a state where it is determined that the shift line map used for gear shift determination is switched to the high fluid temperature shift line map. On the other hand, when the shift line map switching determination flag F is in an off state, that is, in a reset state in which the shift line map switching determination flag F is set at "0", it indicates a state where it is determined that the shift line map is the basic shift line map. In addition, when the determination in S1 is affirmative, in S3 corresponding to the shift line map switching control unit 80, the shift line map used for gear shift determination is switched to the high fluid temperature shift line map, and the shift line map switching determination flag F enters an on (F=1) state to end the routine.

Next, FIG. 11 will be described. As shown in FIG. 11, first, in S11 corresponding to the shift line map switching control unit 80, it is determined whether the shift line map used for gear shift determination is switched to the high fluid temperature shift line map, that is, whether the shift line map switching determination flag F is in an on (F=1) state. That is, it is determined whether the high fluid temperature shift line map is selected.

When the determination in S11 is negative, the routine ends. On the other hand, when the determination in S11 is affirmative, in S12 corresponding to the shift line map switching control unit 80, it is determined whether the hydraulic fluid temperature $T_{OIL}$ is lower than or equal to the fluid temperature determination value $T_{OIL}1$.

When the determination in S12 is negative, in S13 corresponding to the shift line map switching control unit 80, the high fluid temperature shift line map is maintained as the shift line map used for gear shift determination, and then the routine ends. In addition, when the determination in S12 is affirmative, in S14 corresponding to the low power state determination unit 78, it is determined whether the target throttle opening degree $\theta_{TH}^*$ calculated by the target throttle opening degree calculation unit 74 is lower than the prestored low power determination value $\theta_{TH}1$.

When the determination in S14 is negative, S13 is executed and then the routine ends. On the other hand, when the determination in S14 is affirmative, in S15 corresponding to the shift line map switching control unit 80, the shift line map used for gear shift determination is switched back to the basic shift line map, the shift line map switching determination flag F is reset to an off (F=0) state, and then the routine ends.

As described above, the shift controller of the vehicle automatic transmission 16 of the present embodiment includes the low power state determination unit 78 and the shift line map switching control unit 80. The low power state determination unit 78 determines whether the vehicle is in a low power state in which the target throttle opening degree $\theta_{TH}^*$ of the vehicle, used for gear shift determination in the shift control unit 76, is lower than the predetermined low power determination value $\theta_{TH}1$. The shift line map switching control unit 80 determines whether the shift line map used for gear shift determination in the shift control unit 76 is the high fluid temperature shift line map. When the above determination is affirmative, when the hydraulic fluid temperature $T_{OIL}$ is lower than the predetermined fluid temperature determination value $T_{OIL}1$, and when the low power state determination unit 78 determines that the vehicle is in a low power state, the shift line map switching control unit 80 switches the shift line map used for gear shift determination from the high fluid temperature shift line map back to the basic shift line map. Thus, a shift line for determining whether to downshift between predetermined gears in the basic shift line map and a shift line for determining whether to downshift between the predetermined gears in the high fluid temperature shift line map coincide with each other in a lower power region L with respect to the low power determination value $\theta_{TH}1$. Therefore, when the shift line map is switched from the high fluid temperature shift line map back to the basic shift line map, the shift controller prevents the automatic transmission 16 from unexpectedly downshifting because of the switching of the shift line map to suitably avoid driver's uncomfortable feeling due to the unexpected downshift.

In addition, according to the shift controller of the vehicle automatic transmission 16 of the present embodiment, a shift line for determining whether to downshift between predetermined gears in the basic shift line map and a shift line for determining whether to downshift between the predetermined gears in the high fluid temperature shift line map coincide with each other in a lower power region L with respect to the low power determination value $\theta_{TH}1$, and differ from each other in a higher power region H with respect to the low power determination value $\theta_{TH}1$. Thus, when the shift line map is switched from the high fluid temperature shift line map back to the basic shift line map, the shift controller prevents the automatic transmission 16 from unexpectedly downshifting because of the switching of the shift line map to completely avoid driver's uncomfortable feeling due to the unexpected downshift.

In addition, according to the shift controller of the vehicle automatic transmission 16 of the present embodiment, a shift line for determining whether to downshift between predetermined gears in the basic shift line map and a shift line for determining whether to upshift between the predetermined gears in the high fluid temperature shift line map intersect with each other in a higher power region H with respect to the low power determination value $\theta_{TH}1$. Thus, in a state where a vehicle state falls within a range between the shift line for determining whether to downshift and the shift line for determining whether to upshift, which are on a high power side with respect to the above intersection, when the shift line map switching control unit 80 switches from the high fluid temperature shift line map back to the basic shift line map, the automatic transmission 16 definitely attempts to unexpectedly downshift in regard to the switching of the shift line map. However, the switching of the shift line map is not allowed until the vehicle state is in a lower power region L with respect to the low power determination value $\theta_{TH}1$, thus preventing the automatic transmission 16 from downshifting in the higher power region H with respect to the low power determination value $\theta_{TH}1$. This completely avoids driver's uncomfortable feeling due to the unexpected downshift.

The embodiment of the invention is described in detail above with referent to the accompanying drawings. The aspect of the invention is not limited to the above embodiment. The aspect of the invention may also be implemented in another embodiment.

For example, in the above described embodiment, a shift line for determining whether to downshift between predetermined gears in the basic shift line map and a shift line for determining whether to downshift between the predetermined gears in the high fluid temperature shift line map coincide with each other in a lower power region L with respect to the low power determination value $\theta_{TH}1$, and differ from each other in a higher power region H with respect to the low power determination value $\theta_{TH}1$. However, they do not necessarily coincide with each other in the lower power region L. That is, it is only necessary that the above shift lines are adjacent to each other if they do not coincide with each other.

In addition, in the above described embodiment, a shift line for determining whether to downshift between predetermined gears in the basic shift line map and a shift line for determining whether to upshift between the predetermined gears in the high fluid temperature shift line map intersect with each other in a higher power region H with respect to the low power determination value $\theta_{TH}1$. However, they do not necessarily intersect with each other in the higher power region H. That is, it is only necessary that the above shift lines are adjacent to each other if they do not intersect with each other. When the above shift lines are adjacent to each other, there is a possibility that the automatic transmission 16 may downshift in accordance with a slight decrease in vehicle speed V immediately after switching back to the basic shift line map.

In addition, in the above described embodiment, the shift control unit 76 makes gear shift determination on the basis of a vehicle state value that indicates a vehicle state, that is, a vehicle speed V and a target throttle opening degree $\theta_{TH}*$, which corresponds to a required power related value of the vehicle and is calculated by the target throttle opening degree calculation unit 74. However, the aspect of the invention is not limited to this configuration. That is, the required power related value may use an actual throttle opening degree $\theta_{TH}$ detected by the throttle opening degree sensor 5, a fuel injection amount, an accelerator operation amount Acc, or the like.

In addition, in the above described embodiment, the low power determination value $\theta_{TH}1$ in the present embodiment is set to a value corresponding to a throttle opening degree $\theta_{TH}$ at a branch point of a shift line for determining whether to downshift between predetermined gears in the basic shift line map and a shift line for determining whether to downshift between the predetermined gears in the high fluid temperature shift line map. That is, the low power determination value $\theta_{TH}1$ is individually set for each pair of adjacent gears. However, the aspect of the invention is not limited to this configuration. For example, the low power determination value $\theta_{TH}1$ may be set equally (to the same value) so that, for example, when the low power determination value $\theta_{TH}1$ is individually set for each pair of adjacent gears, a minimum value from among the low power determination values $\theta_{TH}1$ is set for the low power determination value $\theta_{TH}1$ for each pair of adjacent gears.

In addition, in the above described embodiment, the vehicle to which the embodiment of the invention is applied is an FF vehicle that includes the transversely mounted automatic transmission 16 and the engine 14 as a power source for propelling the vehicle. However, the vehicle is not limited to the FF vehicle. For example, the aspect of the invention may also be applied to a hybrid vehicle, or the like, that is equipped with an electric motor, or the like, in addition to the engine 14 formed of a gasoline engine, a diesel engine, or the like, for driving the drive wheels. In addition, for example, the aspect of the invention may also be applied to an FR vehicle or a vehicle of another drive system.

Note that the above described embodiment is only illustrative; although other embodiments are not illustrated one by one, the aspect of the invention may be implemented in various forms with modifications or improvements on the basis of the knowledge of a person skilled in the art without departing from the scope of the invention.

What is claimed is:

1. A shift controller of a vehicle automatic transmission, comprising:
    a shift control unit that automatically shifts gears of the automatic transmission on the basis of a vehicle state by referring to a prestored basic shift line map;
    a shift line map switching control unit that switches from the basic shift line map to a high fluid temperature shift line map when a hydraulic fluid temperature in the automatic transmission is higher than a predetermined fluid temperature determination value; and
    a low power state determination unit that determines whether a vehicle is in a low power state in which a required power related value of the vehicle, used for gear shift determination in the shift control unit, is lower than a predetermined low power determination value, wherein
    the shift line map switching control unit switches from the high fluid temperature shift line map back to the basic shift line map when the hydraulic fluid temperature in the automatic transmission is lower than the fluid temperature determination value and when the low power state determination unit determines that the vehicle is in the low power state, and
    each of multiple shift lines of the high fluid temperature shift line map is set on a lower speed side with respect to corresponding multiple shift lines of a low fluid temperature shift line map in a higher power region respect to the predetermined low power determination value.

2. The shift controller according to claim 1, wherein the required power related value is a target throttle opening degree and the low power state is when a target throttle opening degree is lower than the predetermined low power determination value.

3. The shift controller according to claim 2, wherein the multiple shift lines of the high fluid temperature map and the basic shift line map each correspond to a pair of adjacent gears of the vehicle automatic transmission, and the predetermined low power determination value is set for said each pair of adjacent gears of the vehicle automatic transmission.

4. The shift controller according to claim 2, wherein the multiple shift lines of the high fluid temperature map and the basic shift line map each correspond to a pair of adjacent gears of the vehicle automatic transmission, and the low power determination value is set to the same value for said each pair of adjacent gears of the vehicle automatic transmission.

5. The shift controller according to claim 1, wherein the required power related value is any one of an actual throttle opening degree, a fuel injection amount and an accelerator operation amount and the low power state is when any one of the actual throttle opening degree, the fuel injection amount and the accelerator operation amount is lower than the predetermined low power determination value.

6. The shift controller according to claim 5, wherein the multiple shift lines of the high fluid temperature map and the basic shift line map each correspond to a pair of adjacent gears of the vehicle automatic transmission, and the predetermined low power determination value is set for said each pair of adjacent gears of the vehicle automatic transmission.

7. The shift controller according to claim 5, wherein the multiple shift lines of the high fluid temperature map and the basic shift line map each correspond to a pair of adjacent gears of the vehicle automatic transmission, and the predetermined low power determination value is set to the same value for said each pair of adjacent gears of the vehicle automatic transmission.

8. The shift controller according to claim 1, wherein a downshift line for determining whether to downshift between predetermined gears in the basic shift line map and a downshift line for determining whether to downshift between the predetermined gears in the high fluid temperature shift line map substantially coincide with each other in a lower power region with respect to the predetermined low power determination value, and differ from each other in the higher power region with respect to the predetermined low power determination value.

9. The shift controller according to claim 8, wherein the downshift lines coincide with each other in the lower power region with respect to the predetermined low power determination value, and differ from each other in the higher power region with respect to the predetermined low power determination value.

10. The shift controller according to claim 8, wherein a downshift line for determining whether to downshift between predetermined gears in the basic shift line map and an upshift line for determining whether to upshift between the predetermined gears in the high fluid temperature shift line map intersect with each other in the higher power region with respect to the predetermined low power determination value.

11. The shift controller according to claim 8, wherein a downshift line for determining whether to downshift between predetermined gears in the basic shift line map and an upshift line for determining whether to upshift between the predetermined gears in the high fluid temperature shift line map do not intersect with each other but are adjacent to each other in the higher power region with respect to the predetermined low power determination value.

12. The shift controller according to claim 1, wherein a downshift line for determining whether to downshift between predetermined gears in the basic shift line map and an upshift line for determining whether to upshift between the predetermined gears in the high fluid temperature shift line map intersect with each other in a higher power region with respect to the predetermined low power determination value.

13. The shift controller according to claim 1, wherein a downshift line for determining whether to downshift between predetermined gears in the basic shift line map and an upshift line for determining whether to upshift between the predetermined gears in the high fluid temperature shift line map do not intersect with each other but are adjacent to each other in the higher power region with respect to the predetermined low power determination value.

14. The shift controller according to claim 1, wherein the basic shift line map and the high fluid temperature shift line map each formed of multiple shift lines, the multiple shift lines of the high fluid temperature shift map branch from the respective shift lines of the basic shift line map at respective branch points.

15. The shift controller according to claim 1, wherein the predetermined low power determination value is set to a value corresponding to one of the respective branch points.

* * * * *